United States Patent [19]

Sampson

[11] 3,715,657

[45] Feb. 6, 1973

[54] TRANSDUCER FOR CONVERTING SELECTED ENVIRONMENTAL PARAMETER DIFFERENTIALS TO FREQUENCY DIFFERENTIALS

[75] Inventor: Robert W. Sampson, Arlington Heights, Ill.

[73] Assignee: Universal Oil Products Company, Des Plaines, Ill.

[22] Filed: Dec. 28, 1970

[21] Appl. No.: 101,651

[52] U.S. Cl. ..............324/140 R, 73/23.1, 324/65 R, 307/252 F

[51] Int. Cl. ........................G01n 31/08, H03k 17/60

[58] Field of Search..........324/140, 65, 79, 71, 79 D; 328/134; 331/65, 66, 111; 73/23.1; 307/252 F

[56] References Cited

UNITED STATES PATENTS

| | | | |
|---|---|---|---|
| 3,385,100 | 5/1968 | Michael | 73/23.1 |
| 3,475,742 | 10/1969 | Whitney et al. | 331/111 X |
| 3,398,579 | 8/1968 | Carniol et al. | 331/66 X |

OTHER PUBLICATIONS

G. E. Application Note; "The Dist-Aprogram-Mable Unijunction Transistor," W. R. Spofford, Jr.; 11-67; pp. 1 & 8.

*Primary Examiner*—Alfred E. Smith
*Attorney*—James R. Hoatson, Jr. and Charles H. Thomas, Jr.

[57] ABSTRACT

To form a transducer, two uniformly d.c. biased signal detector means are connected in parallel. Each of these signal detector means includes a variable resistor that controls the output frequency of that signal detector means. The variable resistors are located in environments differing only in a parameter for which differential measurement is desired. Such parameters include temperature, thermal absorption, and other variables that affect electrical current flow in the resistors. A non-uniform change in the variable resistors changes the frequency differential existing between the two signal detector means.

2 Claims, 2 Drawing Figures

INVENTOR:
Robert W. Sampson

BY: James R. Hoatson, Jr.
Charles H. Thomas, Jr.
ATTORNEYS

TRANSDUCER FOR CONVERTING SELECTED ENVIRONMENTAL PARAMETER DIFFERENTIALS TO FREQUENCY DIFFERENTIALS

This invention relates to a transducer. More particularly, two uniformly d.c. biased signal detector means are connected in parallel. Each of these signal detector means includes a variable resistor that controls the output frequency of that signal detector means. The variable resistors are located in environments differing only in a parameter for which differential measurement is desired. Such parameters include temperature, thermal absorption and other variables that affect electrical current flow in the resistors. A non-uniform change in the variable resistors changes the frequency differential existing between the two signal detector means.

An electrical component integral to the operation of this invention is a programmable unijunction transistor. A specialized application of a programmable unijunction transistor is used in this invention as will be described hereinafter. The conventional unijunction transistor is a three terminal semiconductor device. A d.c. bias is maintained between the two opposite ends of a silicon bar. One end is called base-one and the other base-two. A single rectifying contact referred to as an emitter is made between base-one and base-two. With a positive bias voltage $V_{BB}$ applied at base-two and base-one grounded, a current will flow and a voltage $\eta V_{BB}$ will be developed at the emitter junction. The silicon bar acts as a simple voltage divider when no current is flowing through the emitter. This is the case when the voltage applied to the emitter is less than $\eta V_{BB}$. In the operation of conventional unijunction transistor circuits, the emitter voltage is gradually increased with no appreciable current flow until the voltage differential between emitter and base-one reaches $\eta V_{BB}$. At this point emitter current starts to flow and the emitter to base-one resistance decreases thus increasing the emitter current. The peak emitter voltage level is governed by the intrinsic standoff ratio $\eta$ of the unijunction transistor and by the voltage $V_{BB}$. Programmable unijunction transistors are distinguishable from other types of unijunction transistors in that the values of the resistors that determine the intrinsic standoff ratio are not integrally fixed but are modular and interchangeable. Through the selection of appropriate resistors and capacitors in the programmable unijunction transistor circuit, the output may be made to oscillate at a desired frequency.

Conventional unijunction transistors and programmable unijunction transistors are currently used as silicon controlled rectifier triggers, in pulse and timing circuits, as oscillators, and in sweep circuits. By utilizing the additional circuit components of this invention conventional programmable unijunction transistors may also be used to form a transducer.

It is an object of this invention to provide a transducer that obviates the need for an additional step in converting analogue signals to digital representations in a digital counter or in a computer memory. In the present invention, an environmental parameter differential is transformed to an electric current or currents fluctuating at frequencies dependent upon the magnitude of the parameter measured at different locations or upon the parameter differential. The frequency or frequencies may trigger an automatic response or be automatically recorded for reference. The simplicity of the electrical circuitry in the system renders the transducer both economical and trouble free. The transducer is also versatile in that it may be made responsive to any of a variety of environmental parameters that affect the electrical flow of current in a circuit. Accordingly, it is a further object of the invention to provide a transducer responsive to changes in environmental parameters including temperature, thermal absorption, and other variables.

In a broad aspect this invention is a transducer comprising uniformly d.c. biased identical first and second signal detector means, a variable independent parameter sensitive resistor controlling the output frequency of said first signal detector means, and a variable reference resistor controlling the output frequency of said second signal detector means, whereby a change in the value of the aforesaid independent parameter causes a change in frequency differential between said first and second signal detector means.

In a specific application one embodiment of this invention is, in a chromatography detector for quantitatively measuring the percentage of each component of a fluid mixture including a thermal absorption sensitive resistor located in a carrier stream containing said fluid mixture and an identical reference resistor located in a reference carrier stream, the improvement comprising uniformly d.c. biased identical first and second signal detector means, wherein said thermal absorption sensitive resistor is connected to and controls the output frequency of said first signal detector means and said reference resistor is connected to and controls the output frequency of said second signal detector means, whereby a change in the quantitative composition of said fluid mixture causes a change in frequency differential between said first and second signal detector means.

The features of the invention are more fully described in the accompanying drawings in which.

Figure 1:
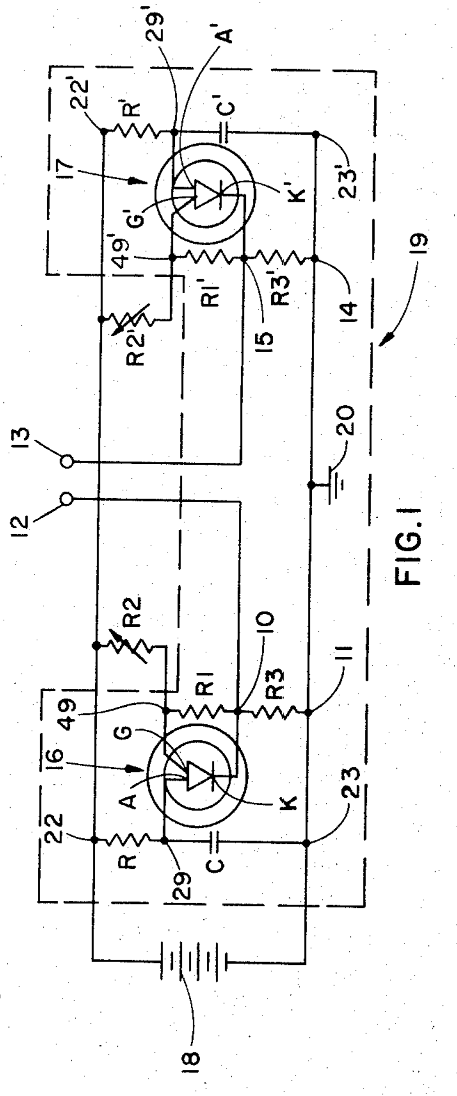
FIG. 1 is a schematic diagram of a simple form of the invention.

Illustrated in FIG. 1 are first and second signal detector means, each comprising modified forms of otherwise conventional relaxation oscillator circuits utilizing programmable unijunction transistors. Both of the signal detector means are included in an envelope 19 with an external power supply 18 and leads 12 and 13 extending therefrom. A description of one of these signal detector means will hold equal applicability to the corresponding primed components of the other signal detector means. The first and second signal detector means are connected in parallel to the direct current power supply 18 at power supply terminals 22 and 23 and 22' and 23' respectively. Uniformity in d.c. biasing of the first and second signal detector means is thereby achieved. The first signal detector means has output terminals 10 and 11, and an input circuit having a fixed resistor R and a capacitor C connected in series across the power supply terminals 22 and 23. A programmable unijunction transistor 16 has an emitter or anode A, a gate G, and a base-one or cathode K. Anode A is connected between the resistor R and the capacitor C. The cathode K is connected to output terminal 10 and a resistor R1 is connected between the gate G and the cathode K. As was previously explained, the external resistances R1 and R2 distinguish the programmable unijunction transistor from other forms of unijunction transistors in which the corresponding resistances are internal. In a programmable unijunction transistor, the circuit designer can select R1 and R2 to program the unijunction characteristics such as intrinsic standoff ratio, interbase resistance, peak point current, and valley current to meet his particular needs. Heretofore, however, it has been the practice to insure that the resistor R2 maintains a constant value despite changing environmental conditions. By substituting the variable resistors R2 and R2' in FIG. 1 for conventional fixed resistors, the circuit of FIG. 1 becomes a transducer responsive to relative changes in the environment surrounding resistor R2 when compared with the environment surrounding the resistor R2'. By varying only one environmental parameter, or by varying a selected combination of environmental parameters, the deviation of the independent parameter or parameters as between the environments surrounding resistors R2 and R2' may be converted from an analogue value to a frequency differential between the first and second signal detector means.

Each of the signal detector means has output terminals. The first signal detector means has output terminals 10 and 11 while the second signal detector means has output terminals 15 and 14. The corresponding output terminals 11 and 14 may be connected together and grounded at 20. Because of the fixed resistors R3 and R3' inserted between the output terminals of the first and second signal detector means respectively, the leads 12 and 13 carry repeated voltages at different frequencies depending upon the difference in resistance values of the resistors R2 and R2'. While the leads 12 and 13 are shown connected to output terminals 10 and 15 respectively, the leads will carry voltages at the same frequencies if they are instead connected to the voltage taps 29 and 29' respectively. Such a modification is intended to be within the scope of this invention.

The frequency differential in the voltage pulses appearing at leads 12 and 13 of the two signal detector means completes the conversion of differential values of an environmental parameter to a frequency differential and thereby forms the transducer of this invention in its broadest aspect. Further treatment of the frequency differential is usually desired, however. A digital counter may be connected to the output terminals of the two signal detector means. In the digital counter a change in value of the independent or measured parameter as between resistors R2 and R2' is converted to a frequency differential and is registered in digital form. Such a digital counter is indicated at 21 in the embodiment of FIG. 2. Some suitable digital counters which may be used as the counter 21 include the Model 5A506 Digital Counter manufactured by Atec, Inc., and the Model 6038 Digital Counter manufactured by the Systron Donner Corporation. Both of these models, when used in this invention, electronically subtract the frequencies appearing at the output terminals 12 and 13 and register the resulting frequency on wires 30 and 31 which pass electronic signals to a visual register 24 having digit indicators 26. Alternatively, the wires 30 and 31 could be connected to the read in device in an electronic computer.

Figure 2:
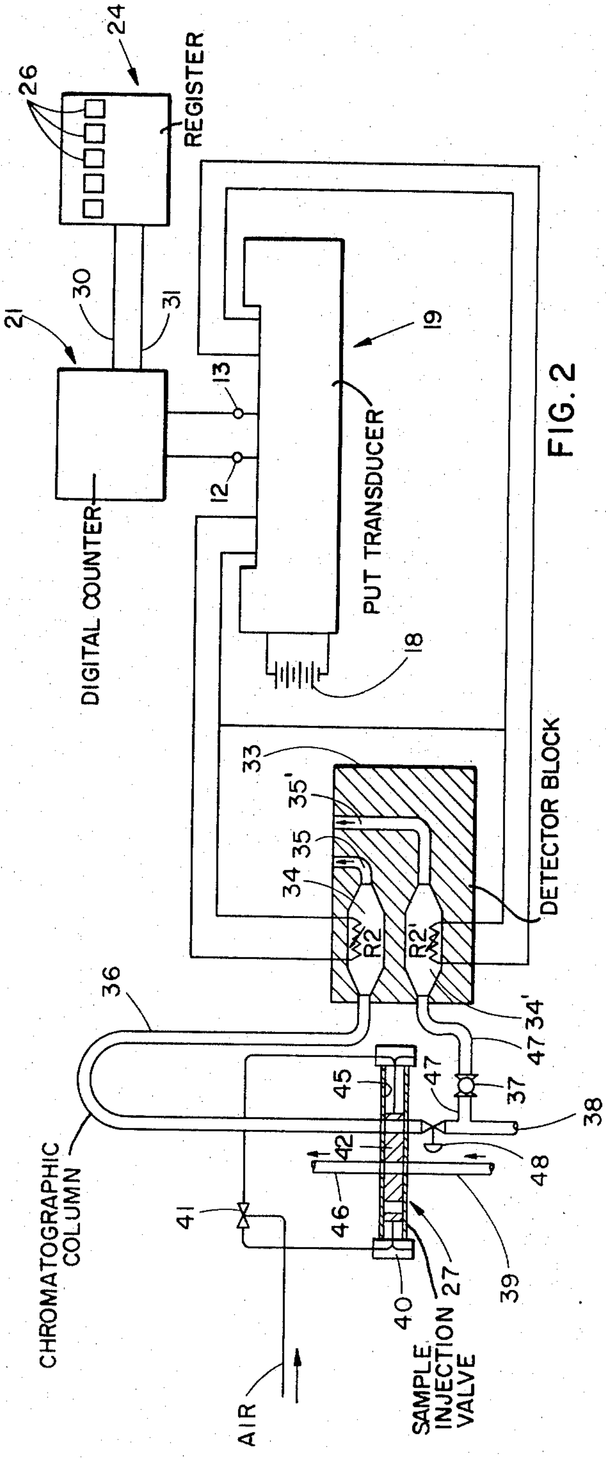
FIG. 2 is a schematic diagram of a chromatography detector utilizing the present invention.

FIG. 2 illustrates a chromatography detector for quantitatively measuring the percentage of each component of a fluid mixture. The first and second signal detector means of this invention are represented only by the envelope 19 in FIG. 2 for the sake of clarity, but it is to be understood that the envelope 19 contains all of the components illustrated in FIG. 1. The chromatography detector of FIG. 2 is comprised of a chromatographic column 36 of the type known as a gas liquid chromatographic column or a partition column. Chromatographic column 36 contains a partitioning liquid that selectively retards passage of components of a sample from a fluid hydrocarbon stream. The partitioning liquid is mounted on a solid support having a high surface area, such as ground firebrick. Sample injection valve 27 is connected to chromatographic column 36, and a carrier gas inlet pipe 38 and a sample inlet pipe 39 pass upward to meet sample injection valve 27. Sample injection valve 27 has a perforated block 42 which can be shuttled back and forth within a cavity 45 and which is capable of capturing a hydrocarbon sample of reproducable size as introduced from pipe 39. Block 42 is moved back and forth within cavity 45 by air pressure which is allowed to push against one end or the other of block 42. The air pressure is selectively gated to the opposing ends of sample injection valve 27 by an injection solenoid 41 which is operated manually or by a timer. Normally a hydrocarbon stream flows from sample inlet pipe 39, through sample injection valve 27, and out to an exhaust pipe 46. At the start of each sampling cycle, however, actuation of solenoid 41 causes sample injection valve 27 to encapsulate a hydrocarbon sample from inlet pipe 39 and place the sample in the line of flow from pipe 38. The sample is carried into chromatographic column 36 by a flow of an inert carrier gas such as helium, entering sample injection valve 27 through carrier gas inlet pipe 38. The carrier gas passes into column 36 through a flow control valve 48 as well as into a pipe 47 branching from pipe 38. A needle valve 37 regulates the flow of gas in branch pipe 47. From branch pipe 47, the carrier gas passes into a cavity 34' in a temperature controlled detector block 33, and out through an outlet duct 35'. At the same time, a fluid hydrocarbon stream of an unknown quantitative composition is passed into inlet pipe 39 and out through exhaust pipe 46 through a direct passageway in sample injection valve 27. The specific qualitative composition of the hydrocarbon stream in pipe 39 is normally initially unknown, but can be determined once the various components from a sample of the hydrocarbon stream are first dissolved in and then eluted from the partitioning liquid in duct 36. A properly selected partitioning liquid will selectively release sample components at relatively long intervals in the order of the boiling points of the components. The interval between the release of successive components distinguishes one component from another even though the boiling points of successive components may be too close to effect distinguishable separation by distillation. Upon actuation of solenoid 41 at the start Of each sampling cycle, the helium carrier gas from pipe 38 leaves the sample injection valve 27 and the chromatographic column 36 carrying with it the sample components injected by sample injection valve 27 sequenced accOrding to the respective boiling points of each component. The carrier gas and sequenced sample components flow into a cavity of detector block 33 and exhaust from detector block 33 through outlet duct 35.

The quantity of carrier gas from branch pipe 47 is used as a reference stream while the carrier gas and entrained hydrocarbon sample components are used to measure changes in a selected environmental parameter. The variable resistors R2 and R2' of the signal detector means are positioned within the cavities 34 and 34' respectively. The cavities 34 and 34' are maintained under very similar environments. The only environmental parameter influencing resistance in the variable resistors that is allowed to vary as between the two cavities is the thermal absorption capability of the gas passing through the respective cavities and out of the detector block 33 through outlet ducts 35 and 35'. This difference in the parameter of thermal absorption capability is sufficient to make a significant difference in the output signals of the signal detector means, however. Because of the gases eluted in the column 36, fluid hydrocarbons separated by boiling points will enter the cavity 34 at different times. The presence of the hydrocarbons will alter the thermal absorption capability of the gas mixture in cavity 34 by an amount dependent upon the boiling points of the hydrocarbons present. That is, the heat absorbing capability is responsive to both quantitative and qualitative changes in the composition of the gas in the cavities. If the hydrocarbons are identified, as is usually the case after passage through column 36, the thermal absorption capability may be used to identify the quantity of each hydrocarbon component present. In achieving this quantitative determination, the thermal absorption capability, affects the temperatures both of the variable independent parameter sensitive resistor R2 and the identical reference resistor R2'. The greater the thermal absorption capability of the gas, the more heat in the cavity will be removed. Heat is generated in the cavities by current flow through the resistors R2 and R2'. Heat removal causes the temperature of the resistors to be lower and the resistance value will therefore also be lower. The reverse is also true.

Since the interbase voltage differential is always constant, the gate leads at G and at G' act as voltage dividers between R2 and R1 + R3 in the first signal detector means and between R2' and R1' + R3' in the second signal detector means. Because R1 + R3 and R1' + R3' have constant resistance values, a decrease in the resistance value of R2 means that the voltage drop across R2 is less and therefore the voltage at the gate G in the first signal detector means is higher. Likewise, if the resistance R2' decreases, the voltage at gate G' will be higher. Conversely, if the resistance R2 increases, the voltage level at the gate G will decrease, whereas if the resistance R2' increases, then the voltage level at gate G' will decrease. The voltage levels at G and G' determine the peak voltages in each of the signal detector means. Since the resistors R and R' are equal and the capacitors C and C' are equal, the power supply 18 charges the capacitors C and C' at the same rate. The voltages at A and A' thereby increase uniformly as long as the peak voltages, as determined by the gates G and G' remain identical. If the resistance value of the thermal absorption sensitive resistor R2 increases, however, due to a decrease in the heat absorbing capacity of the gas within cavity 34, then the peak voltage will decrease since the gate G is at a lower potential. A lower peak voltage means that the capacitor C will achieve the necessary charge to cause current to conduct from A to K in a shorter period of time. This is because less charge is required in order to reach the lowered peak voltage value. The programmable unijunction transistor 16 thereby conducts current until the charge of capacitor C falls below the valley voltage level. This results in a voltage spike appearing at output terminal 10. The voltage spike is thereafter conducted through the output lead 12 to the digital counter 21. Since the capacitor C is continually charging, the voltage spikes will occur intermittently at a frequency $f$.

A similar charging of capacitor C' occurs in the second signal detector means. Because the heat absorbing capability of the gas stream within the cavity 34' does not change even though the heat absorbing capability of the gas stream within cavity 34 does change, however, the current conduction of the programmable unijunction transistor 17 will occur at a different periodic frequency than that of the programmable unijunction transistor 16. Because there is no change in heat absorbing capability due to added components, the resistance R2' does not change accordingly and the voltage at the gate G' will not change along with voltage of the gate G. The frequency with which these voltage spikes occur is a frequency $f'$. The voltage spikes from the second frequency detector means appear at the digital counter 21 at a frequency of $f'$. As previously described, the counter 21 will register the frequency differential $f - f'$ in visual register 26.

A reverse situation arises when the thermal absorption of the gas present in cavity 34 increases. In this case the thermal absorption sensitive resistor R2 decreases in resistance value. Gate G is raised to a higher voltage level, thereby increasing the peak voltage required to cause current flow from the anode to the cathode of the programmable unijunction translstor 16. A longer time interval is required to build up the requisite charge in the capacitor C, so that the intervals between the voltage spikes at output terminal 10 increase. In other words, the frequency $f$ is decreased. In the other cavity 34', the reference resistor R2', which is normally identical to the resistor R2, remains at a higher resistance value since there are no fluid hydrocarbons tending to alter the thermal absorption characteristics of the gas surrounding resistor R2'. The gate G' remains at a lower voltage level than gate G so that the peak voltage in the programmable unijunction transistor 17 is also lower. The time required to charge capacitors C' to the peak voltage is less. In this instance, the frequency differential $f - f'$ which is registered at the counter 21 is a negative value. That is, $f'$ is greater than $f$.

While the system has been described assuming that all environmental parameters except thermal absorption remain constant, this is not the case in actual practice. In the operating system, the cavities 34 and 34' may undergo significant temperature, pressure, humidity, or other environmental deviations. However, such deviations in changes operate on both the independent parameter sensitive resistor R2 and the reference resistor R2′ with offsetting effects on the frequency differential $f-f'$. The frequency differential $f-f'$ thereby remains constant unless one of the environmental parameters is changed in one of the cavities but not in the other cavity. In the chromatography detector illustrated in FIG. 2, the independent parameter is thermal absorption, though in other systems it might be temperature, or any other environmental parameter that tends to alter the resistance values of R2 and R2′. For this reason, the scope of the invention should be taken to include the more general situation where any environmental parameter may be varied in one cavity but not in the other.

The foregoing description and illustrations of the invention disclosed in this application are for purposes of illustration only and no unnecessary limitations as to the scope or use of this invention should be construed therefrom. For example, while all of the corresponding resistors and capacitors of the first and second signal detector means have been described as having equal values under common environmental conditions, components of different values could be used in the two signal detector means. In this case, there would be a resultant frequency differential established even with no variation in environmental conditions as between the two parts of the transducer. Environmental variations would then produce corresponding deviations from the normal frequency differential.

I claim as my invention:

1. In a chromatography detector for quantitatively measuring the percentage of each component of a fluid mixture, including a thermal absorption sensitive resistor located in a carrier stream containing said fluid mixture and an identical reference resistor located in a reference carrier stream, the improvement comprising uniformly d.c. biased identical first and second signal detector means, wherein said thermal absorption sensitive resistor is connected to and controls the output frequency of said first signal detector means and said reference resistor is connected to and controls the output frequency of said second signal detector means, said signal detector means being comprised of first and second input terminals, an input circuit having a fixed resistor and a capacitor connected in series between said first and second input terminals, first and second output terminals, a load resistor connected between said output terminals, a programmable unijunction transistor having an anode, a gate, and a cathode with said anode connected to said input circuit between said fixed resistor and said capacitor and with said cathode connected to said first of the aforesaid output terminals which is connected to said capacitor through said load resistor, said second output terminal and said second input terminal, a resistor connected between said gate and said cathode; said thermal absorption sensitive resistor and said reference resistor being connected between said gate and said first input terminal of said first and second signal detector means respectively, whereby a change in the quantitative composition of said mixture causes a change in frequency differential between said first and second signal detector means.

2. A transducer comprising uniformly d.c. biased identical first and second signal detector means each having: first and second input terminals, and input circuit having a fixed resistor and a capacitor connected in series between said first and second input terminals, first and second output terminals, a load resistor connected between said output terminals, a programmable unijunction transistor having an anode, a gate, and a cathode with said anode connected to said input circuit between said fixed resistor and said capacitor and with said cathode connected to said first of the aforesaid output terminals which is connected to said capacitor through said load resistor, said second output terminal and said second input terminal, and a resistor connected between said gate and said cathode; and a variable environmental condition responsive resistor connected between said gate and said first input terminal of each of said signal detector means, said variable resistor comprising a thermal absorption sensitive resistor, whereby variations of selected environmental parameters as between the variable resistors in said first and second signal detector means produce a frequency differential between the signals appearing at the output terminals of said first and second signal detector means.

* * * * *